(12) United States Patent
Nishiura et al.

(10) Patent No.: US 8,322,160 B2
(45) Date of Patent: Dec. 4, 2012

(54) PROCESS AND APPARATUS FOR PRODUCING GLASS SHEET

(75) Inventors: Noritomo Nishiura, Otsu (JP); Koki Ueda, Otsu (JP); Hidetaka Oda, Otsu (JP); Tomonori Kano, Otsu (JP); Daisuke Nagata, Otsu (JP)

(73) Assignee: Nippon Electric Glass Co., Ltd., Shiga (JP)

(*) Notice: Subject to any disclaimer, the term of this patent is extended or adjusted under 35 U.S.C. 154(b) by 84 days.

(21) Appl. No.: 12/810,162

(22) PCT Filed: Dec. 10, 2008

(86) PCT No.: PCT/JP2008/072450
§ 371 (c)(1),
(2), (4) Date: Jun. 23, 2010

(87) PCT Pub. No.: WO2009/081740
PCT Pub. Date: Jul. 2, 2009

(65) Prior Publication Data
US 2010/0269542 A1    Oct. 28, 2010

(30) Foreign Application Priority Data

Dec. 25, 2007 (JP) ................ 2007-331287
Oct. 28, 2008 (JP) ................ 2008-276628

(51) Int. Cl.
*C03B 17/06* (2006.01)
(52) U.S. Cl. .................. 65/95; 65/90; 65/53
(58) Field of Classification Search ............. 65/90, 95, 65/53
See application file for complete search history.

(56) References Cited

U.S. PATENT DOCUMENTS

| 6,758,064 | B1 | 7/2004 | Kariya |
| 2005/0138966 | A1* | 6/2005 | Pitbladdo .............. 65/29.21 |
| 2006/0042314 | A1* | 3/2006 | Abbott et al. .......... 65/25.3 |
| 2006/0236722 | A1 | 10/2006 | Delia et al. |
| 2006/0242995 | A1* | 11/2006 | Bookbinder et al. ...... 65/134.1 |

FOREIGN PATENT DOCUMENTS

| CN | 1564788 | 1/2005 |
| JP | 02-149438 | 6/1990 |
| JP | 05-124826 | 5/1993 |

(Continued)

OTHER PUBLICATIONS

International Preliminary Report on Patentability and Written Opinion of the International Searching Authority issued Jul. 29, 2010 in International (PCT) Application No. PCT/JP2008/072450.

(Continued)

*Primary Examiner* — Queenie Dehghan
(74) *Attorney, Agent, or Firm* — Wenderoth, Lind & Ponack, L.L.P.

(57) ABSTRACT

A process produces a glass sheet. The process includes down-drawing a molten glass into a sheet-like glass ribbon, in which the molten glass is fed to a forming trough arranged in a forming furnace and the molten glass is caused to flow down from the forming trough through a conveyance passage extending vertically. The process also includes removing an internal strain in the glass ribbon in an annealing furnace, cooling the glass ribbon to around room temperature, and cutting the glass ribbon in a given size, in which a pressure in an outside atmosphere of the forming furnace and/or the annealing furnace is elevated.

7 Claims, 1 Drawing Sheet

FOREIGN PATENT DOCUMENTS

| | | |
|---|---|---|
| JP | 05-163032 | 6/1993 |
| JP | 10-053426 | 2/1998 |
| JP | 2001-31435 | 2/2001 |
| JP | 2004-091244 | 3/2004 |
| WO | 03/014032 | 2/2003 |
| WO | 2006/115792 | 11/2006 |

OTHER PUBLICATIONS

International Search Report issued Feb. 10, 2009 in International (PCT) Application No. PCT/JP2008/072450.

Chinese Office Action issued Mar. 12, 2012 in corresponding Chinese Patent Application No. 200880110320.5 w/English translation.

* cited by examiner

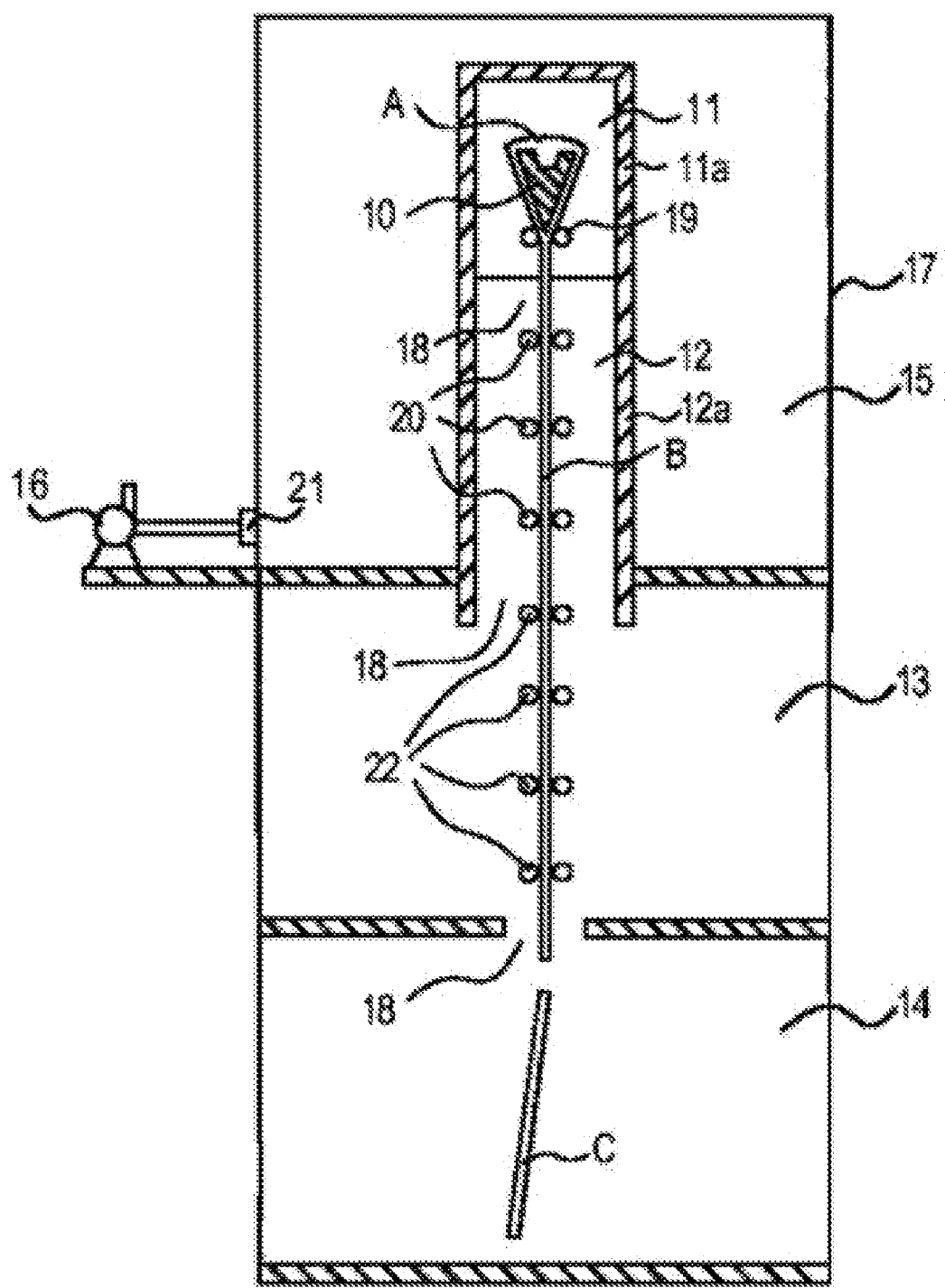

PROCESS AND APPARATUS FOR PRODUCING GLASS SHEET

TECHNICAL FIELD

The present invention relates to a process and apparatus for producing a glass sheet, the process involving causing a molten glass to flow down from a forming trough, and vertically down-drawing a glass ribbon.

BACKGROUND ART

As a process for producing a glass sheet for various electronic instruments, in particular, a flat panel display such as a liquid crystal display, there is known a down-draw method, in which a glass sheet is produced by causing a molten glass to flow down from a forming trough, and vertically down-drawing a glass ribbon.

The down-draw method includes two methods, i.e., an overflow down-draw method and a slot down-draw method. In particular, the overflow down-draw method is widely known as a method, with which a glass sheet having very small waviness and roughness on its surface and being excellent in surface quality can be obtained.

The overflow down-draw method is a method, which involves continuously feeding a molten glass to a top portion of a forming trough having a wedge-shaped cross-section, causing the molten glass to flow down from the top portion of the forming trough along both side surfaces of the forming trough, and allowing the molten glasses to fuse at a lower end portion of the forming trough to form a sheet-like glass ribbon, and causing the glass ribbon to flow down through a conveyance passage extending vertically while holding the glass ribbon at both edge portions with a plurality of pulling rollers, thereby down-drawing the molten glass into a glass ribbon. With this process, the glass ribbon is gradually solidified, and a glass sheet having a given width and thickness is obtained. Further, atmospheric temperature in the conveyance passage is strictly controlled, and the internal strain (thermal strain) in the glass sheet is sufficiently reduced thereby. Then, the glass sheet is cooled to around room temperature.

In a case of a glass sheet for a liquid crystal display, in particular, if even only a minute internal strain remains in the glass sheet, birefringence occurs, and as a result, a uniform image is not provided. Thus, there have conventionally been proposed various ideas for uniformly cooling a glass ribbon as much as possible at a given temperature gradient.

For example, JP-A-5-124826 discloses a structure including supporting a roller on a single side for preventing occurrence of an internal strain in a glass sheet caused by the influence of the cooling of a roller shaft so as to prevent the deformation of the glass sheet, and also discloses a preventive plate against convection for separating a conveyance passage horizontally for preventing the internal strain in a glass ribbon caused by thermal convection occurring in the conveyance passage.

Further, JP-A-10-53426 discloses a process for producing a glass sheet having a small internal strain, the process involving forming a plurality of chambers by separating an internal space of a forming furnace or an annealing furnace horizontally, and allowing each chamber to have a room temperature-controlling function to carry out sufficient annealing.

Still further, JP-A-2001-31435 discloses a technology by which temperature distribution in the annealing furnace is also formed in a width direction of a glass ribbon, to thereby prevent a minute internal strain or deformation.

Patent Document 1: JP-A-5-124826
Patent Document 2: JP-A-10-53426
Patent Document 3: JP-A-2001-31435

SUMMARY OF THE INVENTION

Problem to be Solved by the Invention

In recent years, high definition and high quality are increasingly demanded for a liquid crystal display, and it is demanded for a glass sheet used for the liquid crystal display to have a maximum value of an internal strain of 1.0 MPa or less. Further, a glass sheet for a liquid crystal display is rapidly moving toward a large-size plate. For example, even a glass ribbon having a width of 2000 mm or more as the width size of a portion serving as a final glass product (effective width) is produced. However, as the size of a glass sheet produced is becoming larger, an internal strain in the glass sheet also tends to become larger, and hence it is becoming difficult to control the internal strain to 1.0 MPa or less.

One of the causes for the internal strain in a glass sheet is flow of air climbing along the surface of a glass ribbon (hereinafter referred to as low-temperature airflow). That is, in a conveyance passage of a glass ribbon, low-temperature airflow always climbs along the surface of the glass ribbon, causing easy variation of the atmospheric temperature in an annealing furnace. JP-A-5-139766 discloses formation of a preventive plate against convection in an annealing furnace, but because low-temperature airflow climbs near the surface of a glass ribbon, the preventive plate against convection cannot cut off the low-temperature airflow sufficiently. Further, when a preventive plate against convection is used to fully block low-temperature airflow, it is necessary for the distance between a glass ribbon and the preventive plate against convection to be very small, but in this case, the glass ribbon contacts the preventive plate against convection, thereby causing possible formation of flaws on the surface of the glass ribbon.

The present invention has been made in view of the above-mentioned circumstances. A technological object of the present invention is to provide a process for obtaining a glass sheet of high quality with good productivity by avoiding a problem with an internal strain that becomes serious as the move toward a large-size glass sheet progresses.

Means for Solving the Problem

The inventors of the present invention have made various studies to solve the above-mentioned problem. As a result, the inventors have found that the low-temperature airflow leaks into an outside atmosphere through the gaps of furnace walls of a forming furnace or furnace walls of an annealing furnace, the low-temperature airflow climbing into the annealing furnace from a cooling chamber and a cutting chamber via the conveyance passage of a glass ribbon and then undergoing heating in the annealing furnace, and the climb of low-temperature airflow can be suppressed in the conveyance passage of a glass ribbon by preventing the leakage of inside air in the forming furnace or the annealing furnace. Thus, the present invention has been proposed.

A first aspect of the invention made for solving the above-mentioned problem relates to a process for producing a glass sheet including: a forming step of down-drawing a molten glass into a sheet-like glass ribbon, in which the molten glass is fed to a forming trough arranged in a forming furnace and the molten glass is caused to flow down from the forming trough through a conveyance passage extending vertically; an annealing step of removing an internal strain in the glass ribbon in an annealing furnace; a cooling step of cooling the glass ribbon to around room temperature; and a cutting step of cutting the glass ribbon in a given size, in which a pressure in an outside atmosphere of the forming furnace and/or the annealing furnace is elevated.

A second aspect of the invention made for solving the above-mentioned problem relates to a process for producing a glass sheet including: a forming step of down-drawing a molten glass into a sheet-like glass ribbon, in which the molten glass is fed to a forming trough arranged in a forming furnace and the molten glass is caused to flow down from the forming trough through a conveyance passage extending vertically; an annealing step of removing an internal strain in the glass ribbon in an annealing furnace; a cooling step of cooling the glass ribbon to around room temperature; and a cutting step of cutting the glass ribbon in a given size, in which a pressure in an atmosphere in the forming furnace is adjusted to be higher than that in an atmosphere in the cooling step.

A third aspect of the invention made for solving the above-mentioned problem relates to the process for producing a glass sheet according to the first or second aspect, in which the pressure in the outside atmosphere of the forming furnace and/or the annealing furnace is elevated by introducing air from outside.

A fourth aspect of the invention made for solving the above-mentioned problem relates to the process for producing a glass sheet according to any one of the first to third aspects, in which the forming step includes a step of forming a glass ribbon by an overflow down-draw method or a slot down-draw method.

A fifth aspect of the invention made for solving the above-mentioned problem relates to the process for producing a glass sheet according to any one of the first to fourth aspects, in which a length of a short side of the glass sheet is 2000 mm or more.

A sixth aspect of the invention made for solving the above-mentioned problem relates to the process for producing a glass sheet according to any one of the first to fifth aspects, in which a maximum value of the internal strain of the glass sheet is 1.0 MPa or less.

A seventh aspect of the invention made for solving the above-mentioned problem relates to the process for producing a glass sheet according to any one of the first to sixth aspects, in which the glass sheet contains, in terms of mass %, 40 to 70% of $SiO_2$, 2 to 25% of $Al_2O_3$, 0 to 20% of $B_2O_3$, 0 to 10% of MgO, 0 to 15% of CaO, 0 to 10% of SrO, 0 to 15% of BaO, 0 to 10% of ZnO, 0 to 10% of $ZrO_2$, and 0 to 2% of an fining agent.

An eighth aspect of the invention made for solving the above-mentioned problem relates to an apparatus for producing a glass sheet including: a forming furnace for down-drawing a molten glass into a sheet-like glass ribbon, in which the molten glass is fed to a forming trough and the molten glass is caused to flow down from the forming trough through a conveyance passage extending vertically; an annealing furnace for removing an internal strain in the glass ribbon; a cooling chamber for cooling the glass ribbon to around room temperature; and a cutting chamber for cutting the glass ribbon in a given size, in which the apparatus for producing a glass sheet includes a pressurizing unit for elevating a pressure in an outside atmosphere of the forming furnace and/or the annealing furnace.

A ninth aspect of the invention made for solving the above-mentioned problem relates to the apparatus for producing a glass sheet according to the eighth aspect, in which the pressurizing unit includes a fan.

Effects of the Invention

In the process for producing a glass sheet, which include a forming step of down-drawing a molten glass into a sheet-like glass ribbon, in which the molten glass is fed to a forming trough arranged in a forming furnace and the molten glass is caused to flow down from the forming trough through a conveyance passage extending vertically, an annealing step of removing an internal strain in the glass ribbon in an annealing furnace, a cooling step of cooling the glass ribbon to around room temperature, and a cutting step of cutting the glass ribbon in a given size, the first aspect of the invention enables the elevation of the pressure in the outside atmosphere of the forming furnace and/or the annealing furnace, providing a rare possibility for the inside air of the forming furnace and/or the annealing furnace to leak into the outside atmosphere of the furnaces through the gaps of furnace walls, with the result that the climb of low-temperature airflow can be suppressed in the conveyance passage of the glass ribbon. As a result, the variation of the atmospheric temperature in the annealing furnace can be suppressed to a minimum extent, leading to a sufficient reduction in the internal strain in a glass sheet even if the size of the glass sheet becomes large.

Here, the phrase "elevation of the pressure in the outside atmosphere of a forming furnace and/or an annealing furnace" means elevating the pressure in the outside space (chamber) surrounding any one of the forming furnace and the annealing furnace or both furnaces by using a pressurizing unit. That is, the phrase means that the pressure in the outside space is adjusted so that the outside space has a higher pressure than that provided when the pressurizing unit is not used. It is recommended that the pressure be suitably set to such an extent at which the amount of the leakage of the inside air in the forming furnace and the annealing furnace to the outside of the furnaces is reduced.

Further, the outside space surrounding any or both of the forming furnace and the annealing furnace may be constituted of one chamber or may be separated to two chambers. The outside space is required to keep its airtightness. When the outside space is separated to two chambers, for example, in the case where the forming furnace is surrounded by a forming chamber and the annealing furnace is surrounded by an annealing chamber, the pressure in the forming chamber and the pressure in the annealing chamber have to be adjusted independently.

In the process for producing a glass sheet which includes a forming step of down-drawing a molten glass into a sheet-like glass ribbon, in which the molten glass is fed to a forming arranged in a forming furnace and the molten glass is caused to flow down from the forming trough through a conveyance passage extending vertically, an annealing step of removing an internal strain in the glass ribbon in an annealing furnace, a cooling step of cooling the glass ribbon to around room temperature, and a cutting step of cutting the glass ribbon in a given size, the invention according to claim 2 adjusts a pressure in an atmosphere in the forming furnace to be higher than that in an atmosphere in the cooling step, with the result that the climb of low-temperature airflow can be suppressed in the conveyance passage of the glass ribbon. As a result, the variation of the atmospheric temperature in the annealing furnace can be suppressed to a minimum extent, leading to a sufficient reduction in the internal strain in a glass sheet even if the size of the glass sheet becomes large. As a unit of adjusting the pressure in the atmosphere in the forming furnace so as to be higher than that in the atmosphere in the cooling step in the downstream of the forming furnace, there can be used a method of elevating the pressure in the outside atmosphere in the forming furnace, a method of suppressing the leakage of air from the forming furnace to the outside atmosphere, a method of discharging the atmosphere in the cooling step to the outside, thereby reducing the amount of air climbing through the conveyance passage from the annealing furnace, or the like. Further, it is recommended that the difference in the pressure between the atmosphere in the forming furnace and the atmosphere in the cooling step be suitably selected depending on the scale of apparatuses and temperature conditions. For example, setting a difference of 0.001 atm or more (preferably 0.01 atm or more) provides a given effect.

The third aspect of the invention allows the pressure in the outside atmosphere in the forming furnace and/or the annealing furnace to be elevated by introducing air from the outside, and hence the pressure in the outside atmosphere can be easily elevated by using a fan or the like. That is, a fan is installed outside the chamber surrounding the forming furnace and the annealing furnace, and air is introduced from outside the chamber with the fan, to thereby easily elevate the pressure in the outside atmosphere in the forming furnace and the annealing furnace.

By using the fourth aspect of the invention, the forming step is a step for forming a glass ribbon by an overflow down-draw method or a slot down-draw method and hence a thin plate glass can be efficiently formed. In order to obtain a plate glass particularly excellent in surface quality, it is desirable to employ the overflow down-draw method rather than the slot down-draw method. It should be noted that the slot down-draw method is a method involving supplying a molten glass to a forming trough having an aperture in a long-hole shape (slot shape), then pulling the molten glass out of the aperture of the forming trough to form a sheet-like glass ribbon, and vertically down-drawing the glass ribbon into a glass sheet.

Further, in the present invention, when the glass ribbon is cut in a given size, the glass ribbon flowing down vertically may be cut in the width direction of the glass ribbon (direction perpendicular to the flowing-down direction of the glass ribbon) from the cooling step, or the glass ribbon may be bent from the vertical direction to the horizontal direction and cut in the width direction while being moved in the horizontal direction.

By using the fifth aspect of the invention, the glass sheet has a length of the short side of 2000 mm or more, and hence many glass sheets for a display panel can be cut out from one piece of the glass sheet (original sheet), enabling the improvement in the production efficiency. The larger the size of the glass sheet, the larger the internal strain of the glass sheet tends to be. One of the reasons for that is considered to be that when the size of the glass sheet becomes larger, the apparatus for producing a glass sheet has to be larger, resulting in the easiness for low-temperature air to flow in the conveyance passage of the glass ribbon, with the result that the variation of the atmospheric temperature in the annealing furnace easily occurs. Thus, the present invention becomes useful when the invention is used for producing particularly large glass sheets, specifically, a glass sheet having a length of the short side of 2000 mm or more, preferably 2500 mm or more, or still more preferably 3000 mm or more.

By using the sixth aspect of the invention, the glass sheet has a maximum value of an internal strain of 1.0 MPa or less, and hence the image of a liquid crystal display is prevented from becoming nonuniform due to birefringence. By using the present invention, the variation of the atmospheric temperature in the annealing furnace can be suppressed to a minimum extent, leading to the suppression of the internal strain in the glass sheet even if the size of the glass sheet becomes large. To be specific, it becomes possible to control the maximum value of the internal strain to 1.0 MPa or less, 0.8 MPa or less, or further 0.7 MPa or less.

By using the seventh aspect of the invention, the glass sheet contains, in terms of mass %, 40 to 70% of $SiO_2$, 2 to 25% of $Al_2O_3$, 0 to 20% of $B_2O_3$, 0 to 10% of MgO, 0 to 15% of CaO, 0 to 10% of SrO, 0 to 15% of BaO, 0 to 10% of ZnO, 0 to 10% of $ZrO_2$, and 0 to 2% of a fining agent, and hence the glass sheet satisfies characteristics such as chemical resistance (good acid resistance, good alkali resistance, and good buffered-hydrofluoric-acid resistance), thermal resistance (strain point of 630° C. or more), meltability (1600° C. or less, temperature corresponding to a viscosity of $10^{2.5}$ poise), formability (liquidus temperature of 1150° C. or less), and thermal expansion coefficient (25 to $45 \times 10^{-7}$/° C. at a temperature of 30 to 380° C.). Thus, it is possible to obtain a glass sheet for a liquid crystal display in which the internal strain after formation can be easily suppressed.

The reason why the above-mentioned glass composition is preferred is as follows.

$SiO_2$ is a component for forming the network of glass and has effects of reducing the thermal expansion coefficient of glass, making the internal strain smaller, improving the acid resistance of glass, and elevating the strain point of glass to make the thermal contraction of a glass sheet smaller. However, when the content of $SiO_2$ becomes large, the viscosity of glass becomes higher, with the result that meltability tends to deteriorate and devitrified stones of cristobalite tends to precipitate. Thus, the content of $SiO_2$ is 40 to 70%, preferably 50 to 67%, or more preferably 57 to 64%.

$Al_2O_3$ is a component for reducing the thermal expansion coefficient of glass and for making the internal strain of a glass sheet smaller. Further, $Al_2O_3$ has effects of elevating the strain point of glass and suppressing the precipitation of devitrified stones of cristobalite as well. However, when the content of $Al_2O_3$ becomes large, the buffered-hydrofluoric-acid resistance of glass deteriorates and liquidus temperature rises, resulting in a difficulty in formation. Thus, the content of $Al_2O_3$ is 2 to 25%, preferably 10 to 20%, or more preferably 14 to 17%.

$B_2O_3$ is a component, acting as a melting accelerate component, for reducing the viscosity of glass and for improving the meltability. Further, $B_2O_3$ is a component for reducing the thermal expansion coefficient of glass and for making the internal strain of a glass sheet smaller. However, when the content of $B_2O_3$ becomes large, the strain point of glass easily lowers and the acid resistance easily deteriorates. Thus, the content of $B_2O_3$ is 0 to 20%, preferably 5 to 15%, or more preferably 7.5 to 12%.

MgO is a component for improving the meltability of glass by reducing only the viscosity of the glass without reducing the strain point. However, when the content of MgO becomes large, devitrified stones easily precipitate in glass, and buffered-hydrofluoric-acid resistance lowers, with the result that when a glass sheet is treated with a buffered hydrofluoric acid, the surface of the glass sheet is corroded, a reaction product attaches to the surface, and the surface easily becomes clouded. Thus, the content of MgO is 0 to 10%, preferably 0 to 5%, or more preferably 0 to 3.5%.

CaO is a component for improving the meltability of glass by reducing only the viscosity of the glass without reducing the strain point. However, when the content of CaO becomes large, buffered-hydrofluoric-acid resistance easily deteriorates. Thus, the content of CaO is 0 to 15%, preferably 0 to 12%, or more preferably 3.5 to 9%.

SrO is a component for enhancing the chemical resistance and denitrification resistance of glass. However, when the content of SrO becomes large, the thermal expansion coefficient of glass easily becomes large and the internal strain of a glass sheet tends to become large. Thus, the content of SrO is 0 to 10%, preferably 0 to 8%, or more preferably more than 0.5 to 8%.

BaO is a component for enhancing the chemical resistance and denitrification resistance of glass similar to SrO. However, when the content of BaO becomes large, the density and thermal expansion coefficient of glass tends to become large, and meltability of glass tends to remarkably deteriorate. Thus, the content of BaO is 0 to 15%, preferably 0 to 10%, or more preferably 0 to 8%.

ZnO is a component for improving the buffered-hydrofluoric-acid resistance and meltability of glass. When the content of ZnO becomes large, the denitrification resistance and strain point of glass easily lowers. Thus, the content of ZnO is 0 to 10%, preferably 0 to 5%, or more preferably 0 to 1%.

$ZrO_2$ is a component for raising the strain point of glass. When the content of $ZrO_2$ becomes large, the density of glass remarkably increases, and devitrified stones derived from $ZrO_2$ easily precipitate. Thus, the content of $ZrO_2$ is 0 to 10%, preferably 0 to 7%, or more preferably 0 to 5%.

$As_2O_3$, $Sb_2O_3$, $SnO_2$, $SO_3$, F, Cl, or the like can be used as a fining agent up to 2%. It should be noted that the use of $As_2O_3$ and $Sb_2O_3$ should be avoided because they are environmental load substances, and when the use of $As_2O_3$ and $Sb_2O_3$ is avoided, $SnO_2$ is contained preferably at 0.01 to 2%.

In addition, in the present invention, it is possible that, other than the above-mentioned components, for example, up to 3% each of $Y_2O_3$, $La_2O_3$, $Nb_2O_3$, and $P_2O_5$ can be contained for reducing the liquidus temperature of glass to improve the formability. It should be noted that alkali metal oxides ($R_{2O}$) such as $Na_2O$, $K_2O$, and $Li_2O$ should not be contained because when those components are contained, the characteristics of various films and TFT devices formed on the glass sheet for a liquid crystal display may be degraded. To be specific, the content in terms of $R_{2O}$ must be regulated at 0.1% or less.

By using the eighth aspect of the invention, in which an apparatus for producing a glass sheet includes a forming furnace for feeding a molten glass to a forming trough and causing the molten glass to flow down from the forming trough through a conveyance passage extending vertically, to thereby down-draw the molten glass into a sheet-like glass ribbon, an annealing furnace for removing thermal strain in the glass ribbon, a cooling chamber for cooling the glass ribbon to around room temperature, and a cutting chamber for cutting the glass ribbon in a given size, the apparatus for producing a glass sheet being provided with a pressurizing unit for elevating the pressure in the outside atmosphere of the forming furnace and/or the annealing furnace, the pressure in the outside atmosphere of the forming furnace and/or the annealing furnace can be elevated, providing a rare possibility for the inside air of the forming furnace and/or the annealing furnace to leak into the outside atmosphere, with the result that the climb of low-temperature airflow can be suppressed in the conveyance passage. As a result, the variation of the atmospheric temperature in the annealing furnace can be suppressed to a minimum extent, leading to a sufficient reduction in the internal strain in a glass sheet even if the size of the glass sheet becomes large.

By using the ninth aspect of the invention, in which the pressurizing unit is a fan, a fan is installed outside the chamber surrounding the forming furnace and the annealing furnace, and air is introduced from outside the chamber with the fan, to thereby easily elevate the pressure in the outside atmosphere in the forming furnace and the annealing furnace.

BRIEF DESCRIPTION OF THE DRAWING

FIG. 1 is a schematic front view illustrating an apparatus for producing a glass sheet of the present invention.

DESCRIPTION OF SYMBOLS

10 forming trough
11 forming furnace
11a furnace wall of forming furnace
12 annealing furnace
12a furnace wall of annealing furnace
13 cooling chamber
14 cutting chamber
15 forming chamber
16 fan
17 peripheral wall portion
18 conveyance passage
19 cooling roller (edge roller)
20 pulling roller (annealing roller)
22 supporting roller
A molten glass
B glass ribbon
C glass sheet

DETAILED DESCRIPTION OF THE INVENTION

Hereinafter, an embodiment of the present invention is described in detail in reference to a FIGURE attached.

FIG. 1 is a schematic front view illustrating an apparatus for producing a glass sheet of the present invention. The production apparatus is for producing a glass sheet (glass substrate) for a liquid crystal display by an overflow down-draw method. In the order from the top, the production apparatus is provided with a forming furnace 11 for forming a glass ribbon B by overflowing a molten glass A supplied to a forming trough 10 having a wedge-shaped cross-section from the top portion of the forming trough 10 and allowing the molten glass A to fuse at the lower end portion of the trough 10, an annealing furnace 12 for removing the internal strain in the glass ribbon B while annealing the glass ribbon B, a cooling chamber 13 for sufficiently cooling the glass ribbon B annealed, and a cutting chamber 14 for cutting the glass ribbon B cooled in a given size. In addition, the forming furnace 11 and the annealing furnace 12 are surrounded by a forming chamber 15, a fan 16 is installed outside the forming chamber 15. The cooling chamber 13, the cutting chamber 14, and the forming chamber 15, which are neighboring in the vertical direction, are surrounded by a peripheral wall portion 17 having airtightness. The forming furnace 11, the annealing furnace 12, the cooling chamber 13, and the cutting chamber 14 are communicated with each other via a conveyance passage 18 through which the glass ribbon B flows down. Further, the cutting chamber 14 is provided with another conveyance passage for conveying a glass sheet C to a subsequent step (for example, edge-polishing step) which is not shown.

Next, a production process for a glass sheet using the above-mentioned apparatus for producing a glass sheet is described.

In the production apparatus, the molten glass A is first supplied to the top portion of the forming trough 10 provided in the forming furnace 11, the molten glass A is caused to overflow from the top portion of the forming trough 10, and the molten glass A is fused at the lower end portion of the forming trough 10, to thereby form into a sheet-like glass ribbon B. In the vicinity of the forming trough 10, a pair of cooling rollers (edge rollers) 19 are provided, and the cooling rollers 19 hold both edges of the glass ribbon B, thereby suppressing its contraction in the width direction to a minimum extent.

Next, annealing the formed glass ribbon B in the annealing furnace 12 removes its internal strain. The annealing furnace 12 is provided with a plurality of pairs of pulling rollers (annealing roller) 20 in the vertical direction, and the glass ribbon B is pulled downward while the pulling rollers 20 are pulling the glass ribbon B in the width direction to prevent the glass ribbon B from contracting in the width direction because of surface tension or the like. In addition, the annealing furnace 12 is set so as to have a given temperature gradient controlled by a heater (not shown). Thus, the temperature of the glass ribbon B is gradually lowered as the glass ribbon B flows down through the annealing furnace 12, thereby removing the internal strain produced inside.

In addition, the fan 16 installed outside the forming chamber 15 is operated to introduce air into the forming chamber 15 from outside the chamber through a filter 21 fixed on the peripheral wall portion 17. By this introduction, the pressure in the forming chamber 15, that is, the pressure in the outside atmosphere of the forming furnace 11 and the annealing furnace 12 is elevated, reducing the amount of inside air leaking from the gaps of a furnace wall 11a of the forming furnace 11 and from the gaps of furnace wall 12a of the annealing furnace 12. As a result, it is possible to make the pressure in the atmosphere in the forming furnace 11 higher by 0.001 atm or more than that in the atmosphere in the cooling step, that is, the pressure in the cooling chamber 13.

The cooling chamber 13 in the downstream of the annealing furnace 12 is provided with a plurality of pairs of supporting rollers 22, which pull downward the glass ribbon B solidified in a given width and given thickness. The glass ribbon B is cooled to around room temperature in the cooling chamber 13. The glass ribbon cooled to around room temperature in the cooling chamber 13 is cut into glass sheets C having a given size in the cutting chamber 14, and the glass sheets are conveyed to a subsequent step.

The above-mentioned apparatus for producing a glass sheet was used to form a glass sheet for a liquid crystal display containing, in terms of mass %, 60% of $SiO_2$, 15% of $Al_2O_3$, 10% of $B_2O_3$, 6% of CaO, 6% of SrO, 2% of BaO, and 1% of an fining agent (OA-10, manufactured by Nippon Electric Glass Co., Ltd.).

The dimension of the glass sheet obtained was 2360×2030×0.7 mm. The maximum strain of the glass sheet was measured and was 0.8 MPa.

The same apparatus as that used in the above-mentioned embodiment was used to produce a glass sheet as a comparative example under the same conditions as those described above except that the fan 16 was not operated. The maximum strain of the glass sheet was measured and was 1.1 MPa.

The foregoing shows that the glass sheet obtained in the embodiment has a smaller maximum strain than the glass sheet obtained in the comparative example, and hence the present invention has a greater effect of reducing the internal strain of a glass sheet.

Here, the maximum strain of a glass sheet was determined by measuring strain stress from the birefringence amount of the glass sheet through an optical heterodyne interferometry with a strain indicator manufactured by Uniopt Co., Ltd. The reason why the maximum strain of a glass sheet was determined is that if even only one strong strain is present in the glass sheet, the glass sheet does not meet the product specification for a glass sheet for a liquid crystal display.

It should be noted that the present invention is not limited to the above-mentioned embodiment, and may be carried out in any other various embodiments as long as the embodiments do not deviate from the gist of the present invention.

For example, the above-mentioned embodiment described the case where the present invention was applied to the production of a glass sheet by an overflow down-draw method. In addition to that, for example, the present invention can be likewise applied to the production of a glass sheet by a slot down-draw method.

Further, although the embodiment described the case where the forming furnace and the annealing furnace were surrounded by one chamber (forming chamber), the forming furnace and the annealing furnace may be each surrounded by different chambers (for example, forming chamber and annealing chamber). In that case, a fan is installed outside only one chamber, or fans are installed outside both chambers, thereby independently controlling the pressure.

INDUSTRIAL APPLICABILITY

The process and apparatus for producing a glass sheet of the present invention can be used for the production, mainly of a glass sheet for a liquid crystal display, of a glass sheet used for various flat panel displays, for example, a plasma display, an electroluminescence display such as an OLED display, and a field emission display, and of a glass sheet used as a substrate on which various devices with an electronic display function or various thin films are formed.

The invention claimed is:

1. A process for producing a glass sheet, the process comprising:
    a forming step of down-drawing a molten glass into a sheet-like glass ribbon, in which the molten glass is fed to a forming trough arranged in a forming furnace and the molten glass is caused to flow down from the forming trough through a conveyance passage extending vertically;
    an annealing step of removing an internal strain in the sheet-like glass ribbon in an annealing furnace disposed below the forming furnace;
    a cooling step of cooling the sheet-like glass ribbon to around room temperature in a cooling chamber that is disposed below the annealing furnace so that the cooling chamber communicates with the annealing furnace via the conveyance passage;
    an elevating step of elevating a pressure in an atmosphere outside of the forming furnace and/or the annealing furnace so that a pressure in an atmosphere in the forming furnace is higher than a pressure in an atmosphere in the cooling chamber, thereby restricting a maximum value of an internal strain of the glass sheet to 1.0 MPa or less; and
    a cutting step of cutting the sheet-like glass ribbon into a given size to form the glass sheet.

2. The process for producing a glass sheet according to claim 1, wherein the elevating step of elevating the pressure comprises elevating the pressure in the atmosphere outside of the forming furnace and/or the annealing furnace by introducing air from outside.

3. The process for producing a glass sheet according to claim 1, wherein the forming step of down-drawing the molten glass into the sheet-like glass ribbon comprises forming the sheet-like glass ribbon by an overflow down-draw method or a slot down-draw method.

4. The process for producing a glass sheet according to claim 1, wherein a length of a short side of the glass sheet is 2000 mm or more.

5. The process for producing a glass sheet according to claim 1, wherein the glass sheet contains, in terms of mass %, 40 to 70% of $SiO_2$, 2 to 25% of $Al_2O_3$, 0 to 20% of $B_2O_3$, 0 to 10% of MgO, 0 to 15% of CaO, 0 to 10% of SrO, 0 to 15% of BaO, 0 to 10% of ZnO, 0 to 10% of $ZrO_2$, and 0 to 2% of an fining agent.

6. An apparatus for producing a glass sheet, the apparatus comprising:
   a forming furnace for down-drawing a molten glass into a sheet-like glass ribbon, in which the molten glass is fed to a forming trough and the molten glass is caused to flow down from the forming trough through a conveyance passage extending vertically;
   an annealing furnace for removing an internal strain in the sheet-like glass ribbon, the annealing furnace being disposed below the forming furnace;
   a cooling chamber for cooling the sheet-like glass ribbon to around room temperature, the cooling chamber being disposed below the annealing furnace so that the cooling chamber communicates with the annealing furnace via the conveyance passage;
   a pressurizing unit for elevating a pressure in an atmosphere outside of the forming furnace and/or the annealing furnace so that a pressure in an atmosphere in the forming furnace is higher than a pressure in an atmosphere in the cooling chamber; and
   a cutting chamber for cutting the glass ribbon into a given size to form the glass sheet, the cutting chamber being disposed below the cooling chamber so that the cutting chamber communicates with the cooling chamber via the conveyance passage.

7. The apparatus for producing a glass sheet according to claim 6, wherein the pressurizing unit comprises a fan.

\* \* \* \* \*